United States Patent
Boutnaru

(10) Patent No.: US 11,240,220 B2
(45) Date of Patent: Feb. 1, 2022

(54) SYSTEMS AND METHODS FOR USER AUTHENTICATION BASED ON MULTIPLE DEVICES

(71) Applicant: PAYPAL, INC., San Jose, CA (US)

(72) Inventor: Shlomi Boutnaru, Modiin (IL)

(73) Assignee: PayPal, Inc., San Jose, CA (US)

( * ) Notice: Subject to any disclaimer, the term of this patent is extended or adjusted under 35 U.S.C. 154(b) by 451 days.

(21) Appl. No.: 16/007,957

(22) Filed: Jun. 13, 2018

(65) Prior Publication Data
US 2019/0386972 A1 Dec. 19, 2019

(51) Int. Cl.
| | |
|---|---|
| *G06F 7/04* | (2006.01) |
| *H04L 29/06* | (2006.01) |
| *H04L 9/08* | (2006.01) |
| *G06Q 20/12* | (2012.01) |
| *G06Q 20/40* | (2012.01) |
| *G06Q 20/38* | (2012.01) |

(52) U.S. Cl.
CPC ............. *H04L 63/08* (2013.01); *G06Q 20/12* (2013.01); *G06Q 20/3829* (2013.01); *G06Q 20/4014* (2013.01); *G06Q 20/4016* (2013.01); *H04L 9/0894* (2013.01); *H04L 63/06* (2013.01); *G06Q 2220/00* (2013.01)

(58) Field of Classification Search
CPC ....... H04L 63/08; H04L 9/0894; H04L 63/06; H04L 63/0853; H04L 2463/082; H04L 9/085; G06Q 20/4014; G06Q 20/3829
See application file for complete search history.

(56) References Cited

U.S. PATENT DOCUMENTS

| | | |
|---|---|---|
| 9,130,985 B1 | 9/2015 | Kolman et al. |
| 9,954,680 B1 * | 4/2018 | Machani ................ H04L 9/085 |
| 2010/0235638 A1 | 9/2010 | Irvine |

(Continued)

FOREIGN PATENT DOCUMENTS

| | | |
|---|---|---|
| EP | 1 933 497 A1 | 6/2008 |
| WO | WO 2016/048515 A2 | 3/2016 |

OTHER PUBLICATIONS

"Shamir's Secret Sharing", Wikipedia, Jun. 10, 2018, 6 pages [online], [retrieved on Jun. 12, 2018]. Retrieved from the Internet: <URL:https://en.wikipedia.org/wiki/Shamir%27s_Secret_Sharing>.

(Continued)

*Primary Examiner* — Fatoumata Traore
*Assistant Examiner* — Carlton Johnson
(74) *Attorney, Agent, or Firm* — Haynes and Boone, LLP

(57) ABSTRACT

A user may be authenticated using an authentication scheme based on user access to two or more selected electronic devices. A security key may be assigned to the user. The security key is divided into multiple parts that are distributed among electronic devices associated with the user. The security key can be reconstructed based on a distributed trust among the devices, where some devices may have a higher trust level than others. For example, each device can receive a number of key parts. In response to a request to authenticate the user, parts of the security key may be retrieved from two or more, but less than all, of the plurality of electronic devices associated with the user. The retrieved parts are used to reconstruct the security key, and the user is authenticated based on the reconstructed security key.

20 Claims, 6 Drawing Sheets

(56) References Cited

U.S. PATENT DOCUMENTS

| | | | |
|---|---|---|---|
| 2011/0282972 A1* | 11/2011 | Rosen | H04W 4/021 |
| | | | 709/219 |
| 2014/0201533 A1* | 7/2014 | Kruglick | H04L 63/062 |
| | | | 713/171 |
| 2016/0087957 A1 | 3/2016 | Shah et al. | |
| 2016/0140561 A1 | 5/2016 | Cowan | |
| 2016/0379005 A1 | 12/2016 | O'Hare et al. | |
| 2017/0046712 A1 | 2/2017 | Todasco | |
| 2018/0026973 A1* | 1/2018 | Le Saint | H04W 12/0609 |
| | | | 713/168 |

OTHER PUBLICATIONS

Oberheide, Jonathan et al., "Leveraging the Cloud for Software Security Services", dated Jan. 1, 2012, http://hdl.handle.net/2027_42/91385, 152 pages.

* cited by examiner

SYSTEMS AND METHODS FOR USER AUTHENTICATION BASED ON MULTIPLE DEVICES

BACKGROUND

The present specification generally relates to user authentication, and more specifically, to authenticating a user based on a variable trust schema involving security keys and electronic devices accessible by the user according to various embodiments of the disclosure.

RELATED ART

As the ability to access personal information and perform online transactions grows, the need for secure, yet convenient, ways to authenticate a user rises. Conventional authentication that involves a user name and password has been proven to be both insecure and inconvenient in various aspects, as this technique relies on the user to select a strong password and to keep the password safe from malicious users. Biometric-based authentication techniques, such as fingerprint scan, iris scan, facial recognition, etc., may require additional hardware and/or additional steps performed by the user to collect the biometric data. Similarly, while authentication based on a smart card can be more secure than simply providing a user name and a password, it also requires additional hardware (e.g., a smart card reader) for accepting the smart card. Thus, there is a need for providing an improved authentication system that is both secure and convenient.

Figure 1:
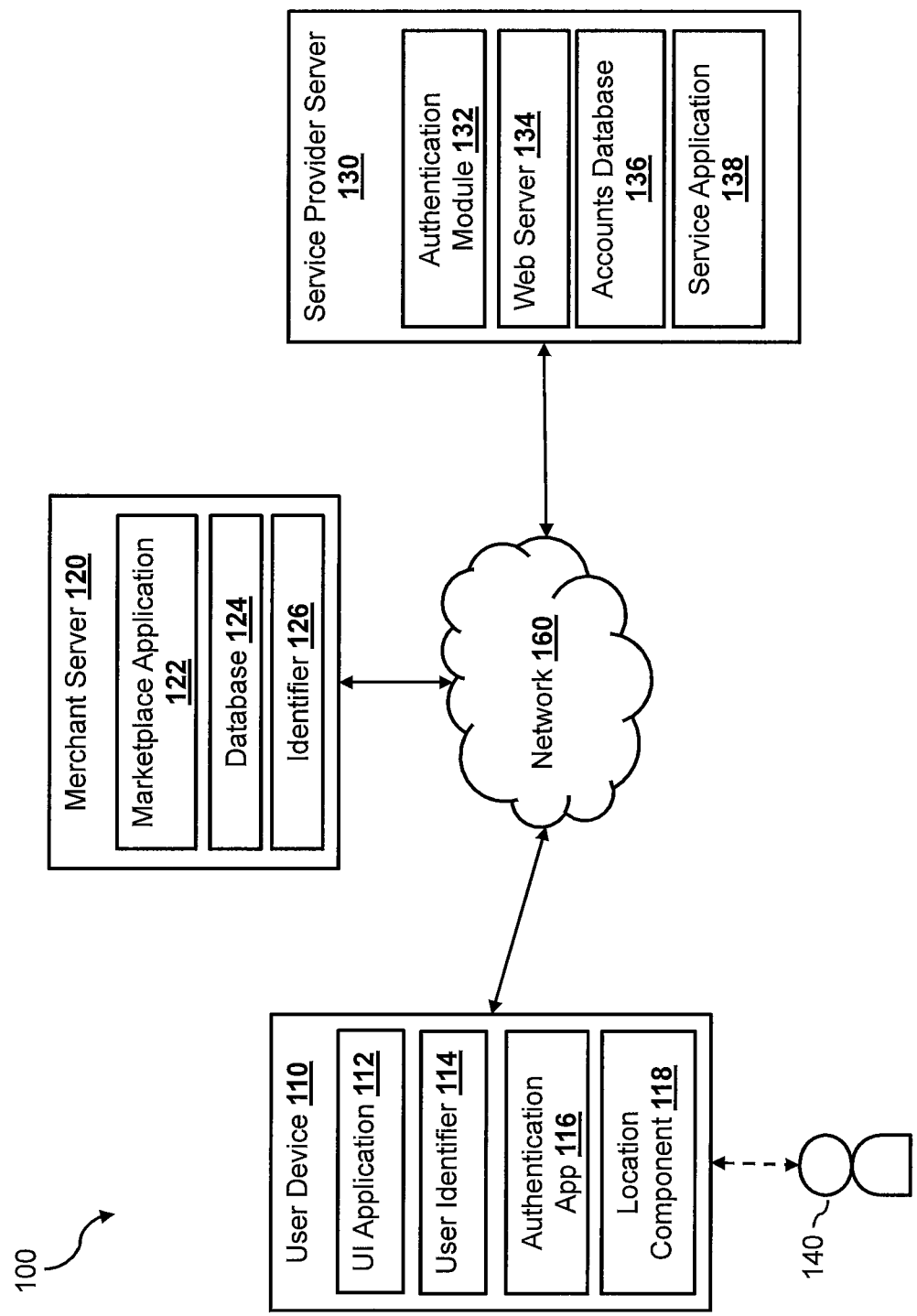
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for authenticating a user based on an accessibility of a user device associated with the user to access two or more selected electronic devices. As networked electronic devices become more prevalent, a user may have access to multiple electronic devices at any given situation, via the user device (e.g., a mobile device) of the user. For example, when the user is at home, the user may access, via the user device, one or more of a home computer, a smart television, a smart speaker, a networked refrigerator, a networked light switch, a networked thermostat, or other smart appliances. The user device may be communicatively coupled with these different electronic devices via different networks. For example, the user device may be communicatively coupled with the home computer via a home Wi-Fi network. The user device may be communicatively coupled with the smart speaker via a Bluetooth connection. The user device may be communicatively coupled with the smart television via an infrared connection. The user device may be communicatively coupled with smart appliances such as the networked refrigerator, the networked light switch, and the networked thermostat via a Zigbee network or any other network protocols.

Similarly, when the user is away from home, the user may use the user device to access an in-vehicle management system of a vehicle (e.g., via a Bluetooth connection, etc.), a home security system (e.g., via an IP connection), a smart watch that the user is wearing (e.g., via a Bluetooth connection), a pair of smart glasses that the user is wearing (e.g., via a Bluetooth connection), a chip on a pair of shoes (e.g., via a near field communication (NFC) connection), a chip on a briefcase, (e.g., via a radio frequency identification connection), etc. When the user is at work, the user may use the user device to access one or more of a work computer (e.g., via the work Wi-Fi network), a smart speaker at work (e.g., via a Bluetooth connection), an external screen (e.g., via an infrared connection), or other electronics in the office. As such, the user may have access to different electronic devices based on a location of the user and/or an activity in which the user engages. Note that the communication protocols and devices listed above are merely examples, and other protocols and/or devices may be used in various embodiments.

Thus, an authentication system may authenticate the user based on the user's ability to access two or more of the electronic devices associated with the user. Notably, as explained below, these various devices may be associated with a particular level of trust, e.g., certain devices may have higher trust levels than other devices (as it may be harder to "hack" certain types of devices vs. others). During registration of the user with the authentication system, the authentication system may obtain identities of the electronic devices accessible by the user. In some embodiments, for each of the electronic devices, the authentication system may also obtain a network protocol through which the electronic device may be communicated with, and a network address.

Furthermore, the authentication system may assign one or more security keys to the user for authenticating the user. A security key that is assigned to the user may be divided into a number of different parts. In some embodiments, the security key may be divided in a manner such that the security key may be reconstructed based on less than the total number of divided parts. For example, the security key may be divided into a total of nine parts, but any four out of the nine parts may be sufficient to reconstruct the security key for authenticating the user.

In some embodiments, the different parts may be distributed among the electronic devices that are accessible by the user, for example, via the user device of the user. One or more parts of the security key may be transmitted to each of the electronic devices accessible by the user based on the network protocols and the network addresses associated with the electronic devices according to a distribution scheme. The parts may then be stored in non-transitory data storages (e.g., a random access memory storage, a flash drive, etc.) of the electronic devices.

Different embodiments may use different techniques to determine a distribution scheme for distributing the parts among the electronic devices. In some embodiments, the authentication system may determine the distribution scheme based on trust scores associated with the electronic devices. For example, when information regarding the electronic devices is obtained, the authentication system may analyze the devices to determine the trust scores for the devices. The trust scores may be determined for the devices based on a security profile of the devices. For example, the authentication system may obtain a security rating for each of the devices and determine a trust score for the device based on the security rating. In some embodiments, the authentication system may access each of the electronic devices (e.g., via the user device), to analyze the hardware configuration (e.g., whether the hardware includes any security modules), the software configuration (e.g., whether the software includes any security modules, whether any security patches are installed, etc.), and a location (e.g., whether the device is fixed at a location) of the device. The authentication system may determine and/or update the trust score of a device based on the analysis of the hardware configuration, the software configuration, and/or the location of the device, and may determine the distribution scheme based on the trust scores of the devices. For example, the distribution scheme may provide a device having a higher trust score (based on the hardware configuration, the software configuration, and/or the location) with a larger number of parts while providing another device having a lower trust score (based on the hardware configuration, the software configuration, and/or the location) with a lower number of parts. Thus, different devices with different trust levels may be assigned greater or lesser influence (via the number of distributed key parts assigned to them) in authentication schemes discussed herein.

In some embodiments, the authentication system may then distribute the parts of the security key among the electronic devices according to the determined distribution scheme. For example, when the security key is divided into nine parts, the authentication system may distribute three parts to the smart television (since the smart television is fixed at a location and can only be connected via an infrared connection which requires a line of sight from a connecting device), one part to the chip of the briefcase (since the briefcase can be located in public areas, can be easily stolen, etc.), two parts to the work computer (since the work computer should be physically located in a safe area), and so forth. Various factors may dictate the particular key part assignments in different embodiments.

A request for authenticating the user may be received via the user device, for example, when the user attempts to log in to a user account of a service provider on the user device or when the user attempts to perform an electronic transaction using the user device. For example, an authentication request can be generated in association with a user logging into a PayPal™ account, or another electronic account. Upon receiving the request, the authentication system may select some, but not all, of the electronic devices for authenticating the user.

In some embodiments, when the authentication system obtains information related to the electronic devices, the authentication system may generate and/or associate different profiles with the electronic devices. In one example, the authentication system may generate a home profile, a work profile, and a commuting profile. Each of the electronic devices may be associated with one or more profiles based on a location and/or a situation in which the user may access the electronic devices. For example, the home computer, the smart television, the networked refrigerator, the networked light switch, and the networked thermostat may be associated with the home profile. The smart watch and the smart glasses may be associated with all of the home profile, the work profile, and the commuting profile. The in-vehicle management system of the vehicle may be associated with a commuting profile. The chip on the shoes and the chip on the briefcase may be associated with both the commuting profile and the work profile. The work computer, the external screen in the office, the smart speaker at work, and the other electronics in the office may be associated with the work profile. Other profile types may be used in various embodiments.

As such, the authentication system may first determine a location and/or activity of the user and select the electronic devices associated with the corresponding profile based on the determined location and/or activity. For example, when the authentication system determines that the user is at home, the authentication system may select electronic devices that are associated with the home profile. Similarly, when the authentication system determines that the user is commuting, the authentication system may select electronic devices that are associated with the commuting profile, and when the authentication system determines that the user is at work, the authentication system may select electronic devices that are associated with the work profile. In some embodiments, however, the authentication system may randomly select the two or more electronic devices from the electronic devices associated with the user.

Furthermore, the authentication system may select a sufficient number of electronic devices such that the total number of parts distributed to the selected electronic devices are sufficient to reconstruct the security key. In some embodiments, the authentication system may select the electronic devices such that at least two electronic devices require two different types of network connections (e.g., different network protocols) to be accessed to enhance the security and the effectiveness of the authentication system.

The authentication system may then access the selected electronic devices via the user device, retrieve the parts from the selected electronic devices, and reconstruct the security key based on the retrieved parts. The authentication system may authenticate the user based on the reconstructed security keys. For example, when all of the selected electronic devices are accessible via the user device, and thus all of the parts that are distributed to the selected electronic devices are retrieved, the reconstructed security key should match the original security key assigned to the user. On the other hand, when less than the required number of parts are retrieved to reconstruct the security key (e.g., when one or more of the selected electronic devices are not accessible via the user device), the reconstructed security key would not match the original security key assigned to the user. Thus, the authentication system may authenticate the user based on the reconstructed security key, and more particularly, based on whether the reconstructed security key matches the original security key assigned to the user.

In some embodiments, the authentication system may update the trust scores of the electronic devices based on new information regarding the security risks of the electronic devices. For example, when the authentication system accesses the selected electronic devices to retrieve the parts, the authentication system may analyze the software configuration of the electronic devices. When it is determined that the software (e.g., the operating system) of the electronic device is updated, the authentication system may increase the trust score of the electronic device. On the other hand, when a new security module/update is available to the electronic device, but is determined to be not installed on the device, the authentication system may reduce the trust score of the electronic device. Based on the updated trust scores of the electronic devices, the authentication system may update the distribution scheme. In some embodiments, the authentication system may remove one or more parts from an electronic device based on the updated trust score of the electronic device. The authentication system may also add one or more parts to an electronic device based on the updated trust score of the electronic device.

In some embodiments, more than one security key may be assigned to the user. The different security keys may be divided into parts differently such that for different security keys, different numbers of parts are required to reconstruct the corresponding security keys. Further, the different security keys may correspond to different risk levels, such that a security key that requires a higher number of parts to be reconstructed may correspond to a higher risk level than a security key that requires a lower number of parts to be reconstructed. For example, a first security key that requires two of the nine divided parts to be reconstructed may correspond to a low risk level, a second security key that requires four of the nine divided parts to be reconstructed may correspond to a medium risk level, and a third security key that requires six of the nine divided parts to be reconstructed may correspond to a high risk level. The parts of the different security keys may be distributed among the electronic devices according to the same distribution scheme or different distribution schemes.

Thus, upon receiving the request to authenticate the user, the authentication system may first determine a risk level associated with the request. For example, when the request is a request to login to a user account, the authentication system may determine the risk level based on a location of the user (e.g., whether the user is located at a location that is normally associated with the user). When the request is a request to perform an electronic payment transaction, the authentication system may determine the risk level based on an amount associated with the transaction (e.g., a high risk level when the amount exceeds a predetermined threshold, a low risk level when the amount is below another predetermined threshold, etc.). The authentication system may then select one of the security keys assigned to the user based on the determined risk level of the request and retrieve the parts from the selected electronic devices that correspond to the selected security key. As discussed above, the authentication system may reconstruct the security key based on the retrieved parts, and authenticate the user based on the reconstructed security key.

FIG. 1 illustrates an electronic transaction system 100 in which the authentication system may be implemented according to one embodiment of the disclosure. The electronic transaction system 100 includes a service provider server 130, a merchant server 120, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to log in to a user account to conduct account services or conduct various electronic transactions (e.g., electronic payment transactions, etc.) with the service provider server 130. Similarly, a merchant associated with the merchant server 120 may use the merchant server 120 to log in to a merchant account to conduct account services or conduct various electronic transactions (e.g., electronic funds transactions, etc.) with the service provider server 130. The user device 110, in various embodiments, may be implemented using any appropriate combination of hardware and/or software configured for wired and/or wireless communication over the network 160. In various implementations, the user device 110 may include at least one of the user devices described herein, such as a wireless cellular phone, wearable computing device, PC, laptop, etc.

The user device 110, in one embodiment, includes a user interface (UI) application 112 (e.g., a web browser), which may be utilized by the user 140 to conduct electronic transactions (e.g., shopping, purchasing, bidding, etc.) with the service provider server 130 over the network 160. In one aspect, purchase expenses may be directly and/or automatically debited from an account related to the user 140 via the user interface application 112.

In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include an authentication application 116 that implements at least some of the authentication functionalities disclosed herein. For example, during registration of the user 140 to the authentication system, the authentication application 116 may provide an interface to the user 140 to obtain information related to electronic devices associated with the user 140, the network protocols and network addresses associated with the electronic devices, and to set up one or more profiles for the electronic devices. The authentication application 116 may also distribute parts of one or more security keys assigned to the user 140 to the electronic devices.

In some embodiments, the authentication application 116 may be communicatively coupled with and/or integrated with the user interface application 112 to detect when a request to authenticate the user 140 is received. For example, the authentication application 116 may receive a request to authenticate the user 140 when the user 140 is logging in to a user account with the service provider server 130 or perform an electronic transaction with the user account via the user interface application 112. When the request to authenticate the user 140 is received, the authentication application 116 may retrieve parts from one or more electronic devices based on the request to authenticate the user 140. In some embodiments, the authentication application 116 may reconstruct the security key based on the retrieved parts, and authenticate the user 140 based on the reconstructed key.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. The identifier 114 may include one or more attributes related to the user 140 of the user device 110, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the identifier 114 may be passed with a user login request to the service provider server 130 via the network 160, and the identifier 114 may be used by the service provider server 130 to associate the user with a particular user account maintained by the service provider server 130.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

The user device 110, in various embodiments, includes a location component 118 configured to determine, track, monitor, and/or provide an instant geographical location of the user device 110. In one implementation, the geographical location may include GPS coordinates, zip-code information, area-code information, street address information, and/or various other generally known types of location information. In one example, the location information may be directly entered into the user device 110 by the user via a user input component, such as a keyboard, touch display, and/or voice recognition microphone. In another example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used. For example, location information may be obtained by checking in using the user device 110 via a check-in device at a location, such as a beacon. This helps to save battery life and to allow for better indoor location where GPS typically does not work.

Even though only one user device 110 is shown in FIG. 1, it has been contemplated that one or more user devices (each similar to user device 110) may be communicatively coupled with the service provider server 130 via the network 160 within the system 100.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 122, in one embodiment, may include a marketplace application 122, which may be configured to provide information over the network 160 to the user interface application 112 of the user device 110. For example, the user 140 of the user device 110 may interact with the marketplace application 122 through the user interface application 112 over the network 160 to search and view various items available for purchase in the merchant database 124.

The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of providing various electronic services offered by the service provider to a merchant, such as providing an online platform that facilitates electronic payment between customers of the merchant and the merchant itself. For example, the merchant server 120 may use an application programming interface (API) that allows it to offer sale of goods or services in which customers are allowed to make electronic payments through the service provider server 130, while the user 140 may have an account with the service provider server 130 that allows the user 140 to use the service provider server 130 for making electronic payments to merchants that allow use of authentication, authorization, and electronic payment services of the service provider. The merchant may also have an account with the service provider server 130. Even though only one merchant server 120 is shown in FIG. 1, it has been contemplated that one or more merchant servers (each similar to merchant server 120) may be communicatively coupled with the service provider server 130 and the user device 110 via the network 160 in the system 100.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the electronic transactions such as logging in to a user account, electronic payment transactions, onboarding transactions, and/or other electronic services offered by the service provider server 130. In one example, the service provider server 130 may be provided by PayPal®, Inc. of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to serve web content to users in response to HTTP requests. As such, the web server 134 may include pre-generated web content ready to be served to users. For example, the web server 134 may store a log-in page, and is configured to serve the log-in page to users for logging into user accounts of the users to access various service provided by the service provider server 130. The web server 134 may also include other webpages associated with the different electronic services offered by the service provider server 130. As a result, a user may access a user account associated with the user and access various services offered by the service provider server 130, by generating HTTP requests directed at the service provider server 130.

In various embodiments, the service provider server includes an authentication module 132 that is configured to authenticate the user 140 based on the accessibility of the user device 110 to two or more of the electronic devices registered under the user account of the user 140 according to various embodiments of the disclosure. In some embodiments, the authentication module 132 may generate one or more security keys for the user 140, and divide the security keys into multiple parts. The authentication module 132 may also distribute the parts to the electronic devices associated with the user 140 via the authentication application 116 according to a distribution scheme.

The authentication module 132 may receive an authentication request. For example, the authentication request may be received from the web server 132 when the web server 132 receives a request to log into a user account from the user interface application 112 of the user device 110. The request may be received from the service application 138 when the service application 138 receives a request to perform one or more electronic transactions with the service provider server 130 from the user device 110. The request may also be received from the marketplace application 122 of the merchant server 120 when the user 140 performs an online purchase transaction with the merchant server 120. Upon receiving the authentication request, the authentication module 132 may select two or more of the electronic devices associated with the user 140, and retrieve parts from the selected two or more electronic devices via the authentication application 116. The authentication module 132 may reconstruct the security key based on the parts retrieved via the authentication application 116, and authenticate the user 140 based on the reconstructed security key. In some embodiments, the authentication module 132 and the authentication application 116 are part of the authentication system that can provide the authentication functionalities as disclosed herein as a standalone application or be integrated with one or more services, such as ones associated with the service provider server 130 as illustrated herein.

The service provider server 130, in one embodiment, may be configured to maintain one or more user accounts and merchant accounts in an account database 136, each of which may include account information associated with one or more individual users (e.g., the user 140 associated with user device 110) and merchants. For example, account information may include information related to the electronic devices associated with a corresponding user account (e.g., identities of the electronic devices, the network protocols and the network addresses of the electronic devices, etc.), private financial information of users and merchants, which may be used by the authentication module 132 to authenticate users. In certain embodiments, account information also includes user purchase profile information such as account funding options and payment options associated with the user, payment information, receipts, and other information collected in response to completed funding and/or payment transactions.

Figure 2:
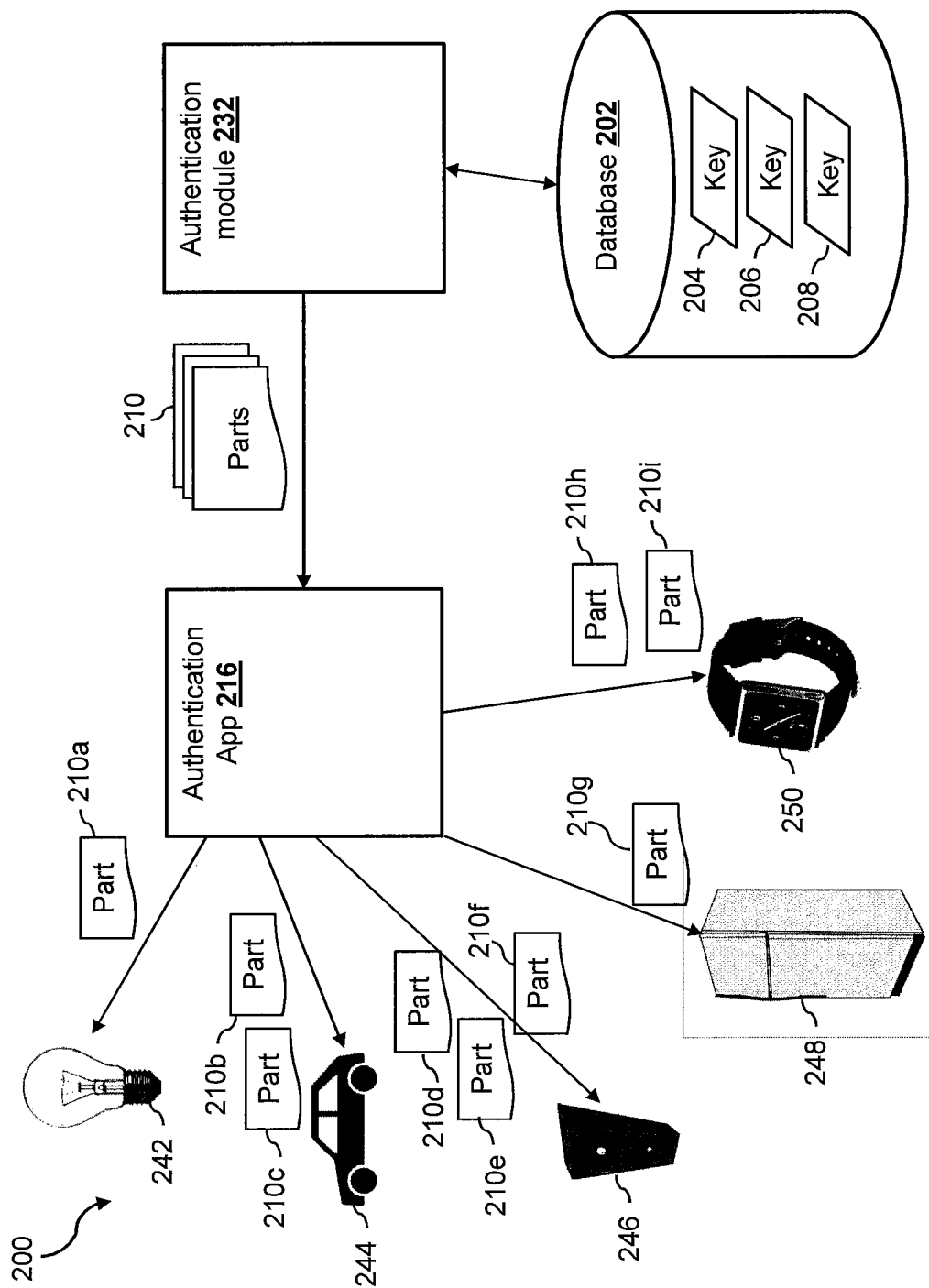
FIG. 2 is a block diagram illustrating an authentication system according to an embodiment of the present disclosure.

FIG. 2 illustrates an authentication system 200 according to one embodiment of the disclosure. The authentication system 200 includes an authentication application 216, an authentication module 232, a database 202, and electronic devices including a networked light switch 242, an in-vehicle management system 244 of a vehicle of the user 140, a smart home entertainment system 246, a networked refrigerator 248, and a smart watch 250. The authentication application 216 may correspond to the authentication application 116 of the user device 110, and the authentication module 232 may correspond to the authentication module 132 of the service provider server 130. The electronic devices 242-250 may be connected and accessed by the user device 110 via different network protocols. For example, the networked light switch 242 may be connected via a Zigbee connection, the in-vehicle management system 244 may be connected via a Bluetooth connection, the smart home entertainment system 246 may be connected via a wireless infrared communication connection, the networked refrigerator 248 may be connected via a Wi-Fi connection using the Internet Protocol (IP), and the smart watch 250 may be connected via a Bluetooth connection.

Figure 3:
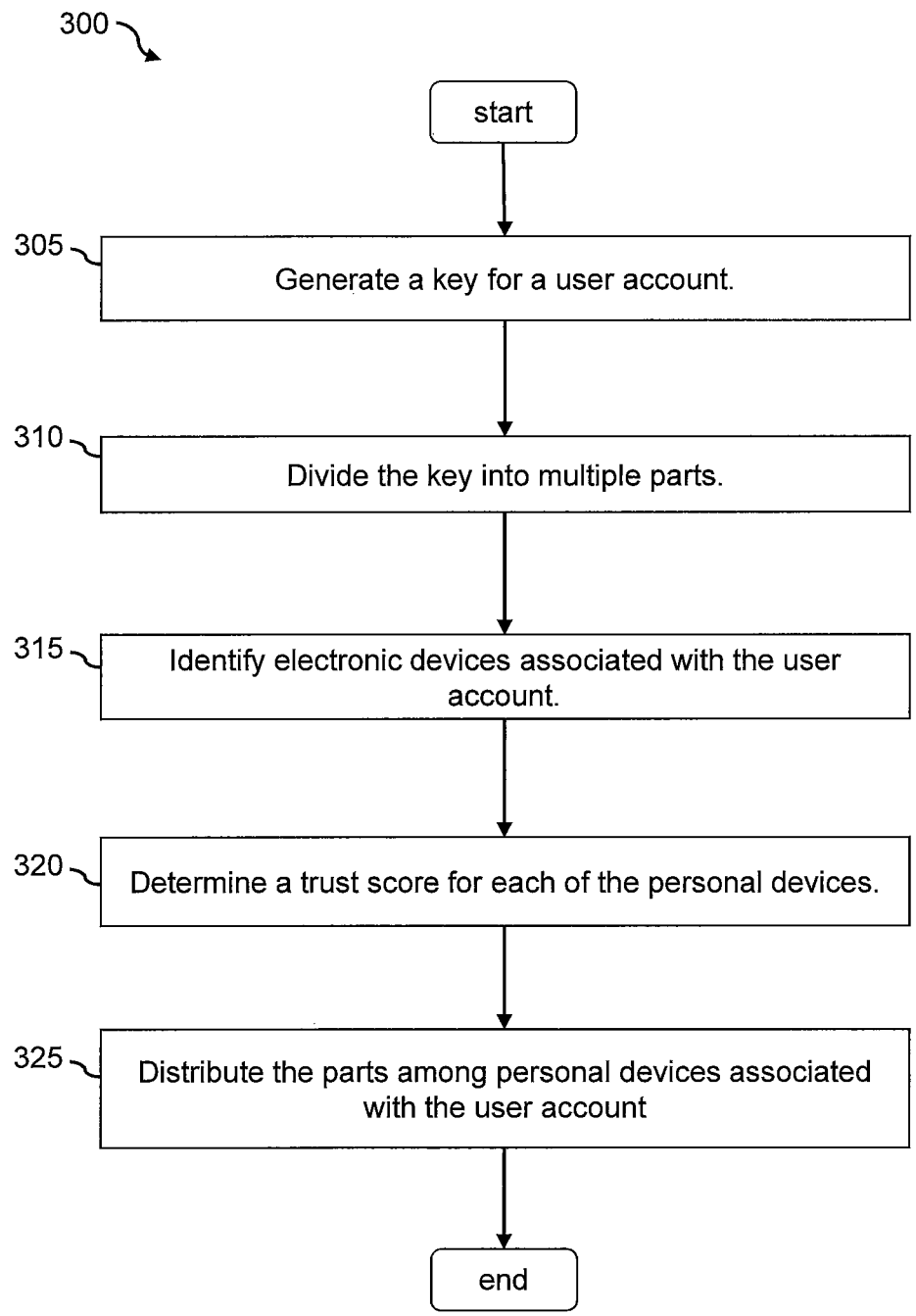
FIG. 3 is a flowchart showing a process of registering a user with an authentication system according to an embodiment of the present disclosure.

FIG. 3 illustrates a process 300 for registering a user to the authentication system 200 according to an embodiment of the disclosure. In some embodiments, the process 300 may be performed by the authentication system 200. The process 300 begins by generating (at step 305) a security key for a user account. For example, the authentication application 216 may provide a user interface that enables the user 140 to register with the authentication system 200. During the registration process, the authentication module 232 may generate a security key 204 for a new user account associated with the user 140. In some embodiments, the security key 204 may be a private key that corresponds to a public key in an asymmetric cryptography system.

The process 300 then divides (at step 310) the security key into multiple parts. For example, the authentication module 232 may divide the security key 204 according to a scheme (e.g., the Shamir's Secret-Sharing scheme), such that less than the total number of the divided parts are needed to reconstruct the security key 204. Under the Shamir's Secret-Sharing scheme, the security key 204 may be expressed as a polynomial having multiple coefficients. Each of the divided parts may represent a point (e.g., a non-zero integer input to the polynomial, and the corresponding integer output) associated with the polynomial, such that a number of the parts (less than the total number of divided parts) may be needed to reconstruct the polynomial (the security key 204). In some embodiments, the authentication module 232 may determine the number of parts desired or needed to reconstruct the security key 204 before dividing the security key 204. For example, the authentication module 232 may determine to divide the security key 204 into nine parts, where any four parts are needed to reconstruct the security key 204. The authentication module 232 may then divide the security key 204 into nine parts 210 (210a-210i) under the Shamir's Secret-Sharing scheme using the determined parameters.

The process 300 then identifies (at step 315) electronic devices associated with the user account. For example, during the registration process, the authentication application 216 may obtain identities of the electronic devices from the user 104 to be associated with the user account. In some embodiments, the authentication application 216 may have access to the networking hardware (e.g., network cards, network adaptors, antennas, etc.) of the user device 110. The authentication application 216 may prompt the user 104 to access the electronic devices to be associated with the user account via the authentication application 116. The user 104 may have to indicate a network protocol (e.g., a Wi-Fi protocol, a Bluetooth protocol, a Zigbee protocol, a wireless infrared communication protocol, etc.) and possibly a network address associated with the electronic devices. In some embodiments, the authentication application 116 may discover the electronic devices based on the selected network protocol, and may enable the user 140 to select from the discovered devices. As discussed herein, the electronic devices may be located in different locations (e.g., at home, at work, etc.). Thus, the authentication application 216 may enable the user 104 to continue to register new electronic devices to be associated with the user account over a period of time (e.g., several days, etc.).

As new electronic devices are added to be associated with the user account, information related to the electronic devices are obtained and stored (e.g., in the database 202). The information of each electronic device may include a name (e.g., assigned by the user 104), a network protocol for connecting to the electronic device, and a network address. Furthermore, as the authentication application 216 accesses each of the electronic devices, the authentication application 216 may allocate a space in the non-transitory memory (e.g., a random access memory, a flash drive, etc.) of the electronic device for storing parts of one or more security keys.

The authentication module 232 may also determine a trust score for each electronic device based on a security profile of the electronic device. For example, when the authentication application 216 accesses an electronic device during the registration process, the authentication application 216 may analyze a network connection type, a hardware configuration, a software configuration, and a location (e.g., detected based information obtained from the location component 118 of the user device 110 when the electronic device is accessed via the user device 110). For example, the trust score of an electronic device may begin as '0,' and as a network connection type, a hardware configuration, a software configuration, and/or the location that improves the security of the electronic device is uncovered, the authentication system 200 may increase the trust score of the electronic device accordingly. In one example, the trust score of a smart watch 250 may be increased by the authentication system 200 based on the authentication system 200 determining that the latest security software has been installed on the smart watch 250. The authentication system 200 may determine a trust score of '20' for the smart watch 250. In another example, the trust score of the smart home entertainment system 246 is increased by the authentication system 200 based on the authentication system 200 determining that the connection type (e.g., a wireless infrared communication) of the smart home entertainment system 246 requires a line of sight with the connecting device and the smart home entertainment system is fixed on a second story of a home of the user 140. The authentication system 200 may determine a trust score of '30' for the smart home entertainment system 246. In yet another example, the authentication system 200 may determine that the networked refrigerator 248 can be connected externally via IP connection and a latest security software has not been installed on the networked refrigerator 248. Thus, the authentication system 200 may determine a low trust score of '10' for the networked refrigerator 248. Similarly, the authentication system 200 may determine a trust score of '10' for the networked light switch 242 and a trust score of '20' for the in-vehicle management system 244.

Thus, the authentication system 200 may determine different trust scores for the different electronic devices 242-250. In some embodiments, the authentication system 200 may determine a distribution scheme for the electronic devices 242-250 based on the trust scores of the electronic devices 242-250. For example, the distribution scheme may provide for distributing the parts 210a-210i in proportion to the trust scores determined for the electronic devices. Thus, under the distribution scheme, the authentication system 200 may distribute one part of the security key 204 to the networked light switch 242 (based on a trust score of '10'), two parts of the security key 204 to the in-vehicle management system 244 (based on a trust score of '20'), three parts of the security key 204 to the smart home entertainment system 246 (based on a trust score of '30'), one part of the security key 204 to the networked refrigerator (based on a trust score of '10'), and two parts of the security key 204 to the smart watch 250 (based on a trust score of '20').

At step 325, the divided parts of the security key are distributed among the electronic devices. For example, the authentication module 232 may transmit the parts 210 of the security key 204 and the distribution scheme to the authentication application 216. In turn, the authentication application 216 may distribute the parts 210a-210i to the electronic devices 242-250 according to the distribution scheme. For example, the authentication application 216 may transmit the part 210a to the networked light switch 242 via a Zigbee connection and store the part 210a in the allocated memory space of the networked light switch 242. Similarly, the authentication application 216 may transmit the parts 210b and 210c to the in-vehicle management system 244 via a Bluetooth connection and store the parts 210b and 210c in the allocated memory space of the in-vehicle management system 244, the authentication application 216 may transmit the parts 210d, 210e, and 210f to the smart home entertainment system 246 via a wireless infrared communication connection and store the parts 210d, 210e, and 210f in the allocated memory space of the smart home entertainment system 246, the authentication application 216 may transmit the part 210g to the networked refrigerator 248 via a Wi-Fi connection and store the part 210g in the allocated memory space of the networked refrigerator 248, and the authentication application 216 may transmit the parts 210h and 210i to the smart watch 250 via a Bluetooth connection and store the parts 210h and 210i in the allocated memory space of the smart watch 250.

In some embodiments, more than one security key may be generated for the user 104 during the registration process. For example, as disclosed herein, different security keys may be generated for the user account of the user 104, where each of the security keys corresponds to a different risk level. For example, the security key 204 may correspond to a medium risk level. The authentication system 200 may generate a security key 206 that corresponds to a low risk level and a security key 208 that corresponds to a high risk level. In some embodiments, the different security keys 204-206 require different minimum numbers of parts in order to be reconstructed. For example, since the security key 206 corresponds to a low risk level, the authentication system 200 may divide the security key 206 in a manner such that a lower number (lower than the number of parts required for the security key 204 to be reconstructed) (e.g., two parts) of parts are required for the security key 206 to be reconstructed. Since the security key 208 corresponds to a high risk level, the authentication system 200 may divide the security key 208 in a manner such that a higher number (higher than the number of parts required for the security key 204 to be reconstructed) (e.g., six parts) of parts are required for the security key 208 to be reconstructed. The parts may be transmitted and distributed among the electronic devices 242-250 in the same manner as discussed above by reference to step 325. In some embodiments, the parts of the additional keys 206 and 208 may be distributed among the electronic devices 242-250 under the same distribution scheme determined in the step 325. The authentication module 232 may also store information related to the parts being distributed to the electronic devices 242-250 (e.g., the number of parts stored in each of the electronic devices 242-250, the identity of the parts being distributed to each of the electronic devices 242-250, etc.) in the database 202.

Figure 4:
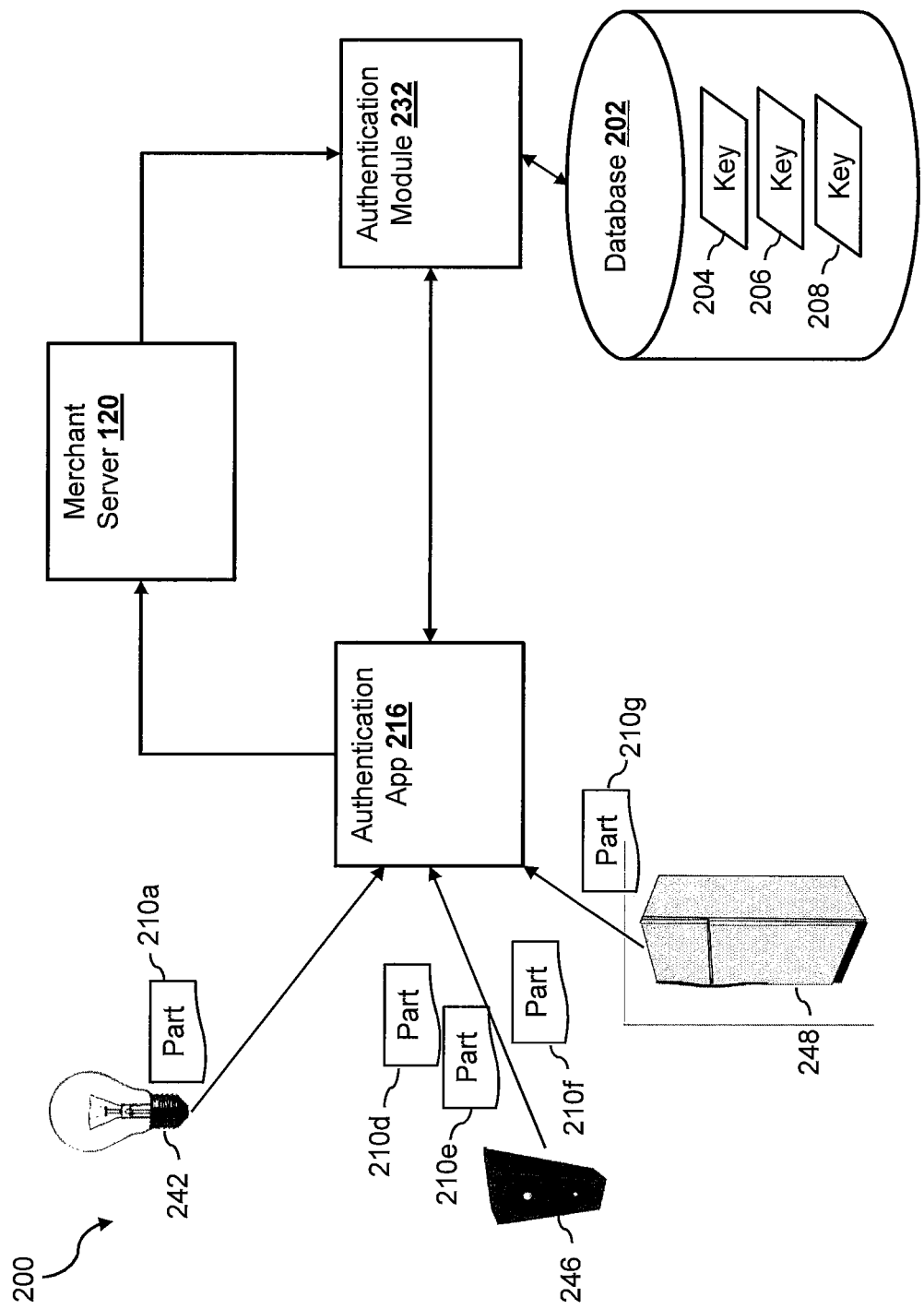
FIG. 4 is a block diagram illustrating an authentication system according to an embodiment of the present disclosure.
Figure 5:
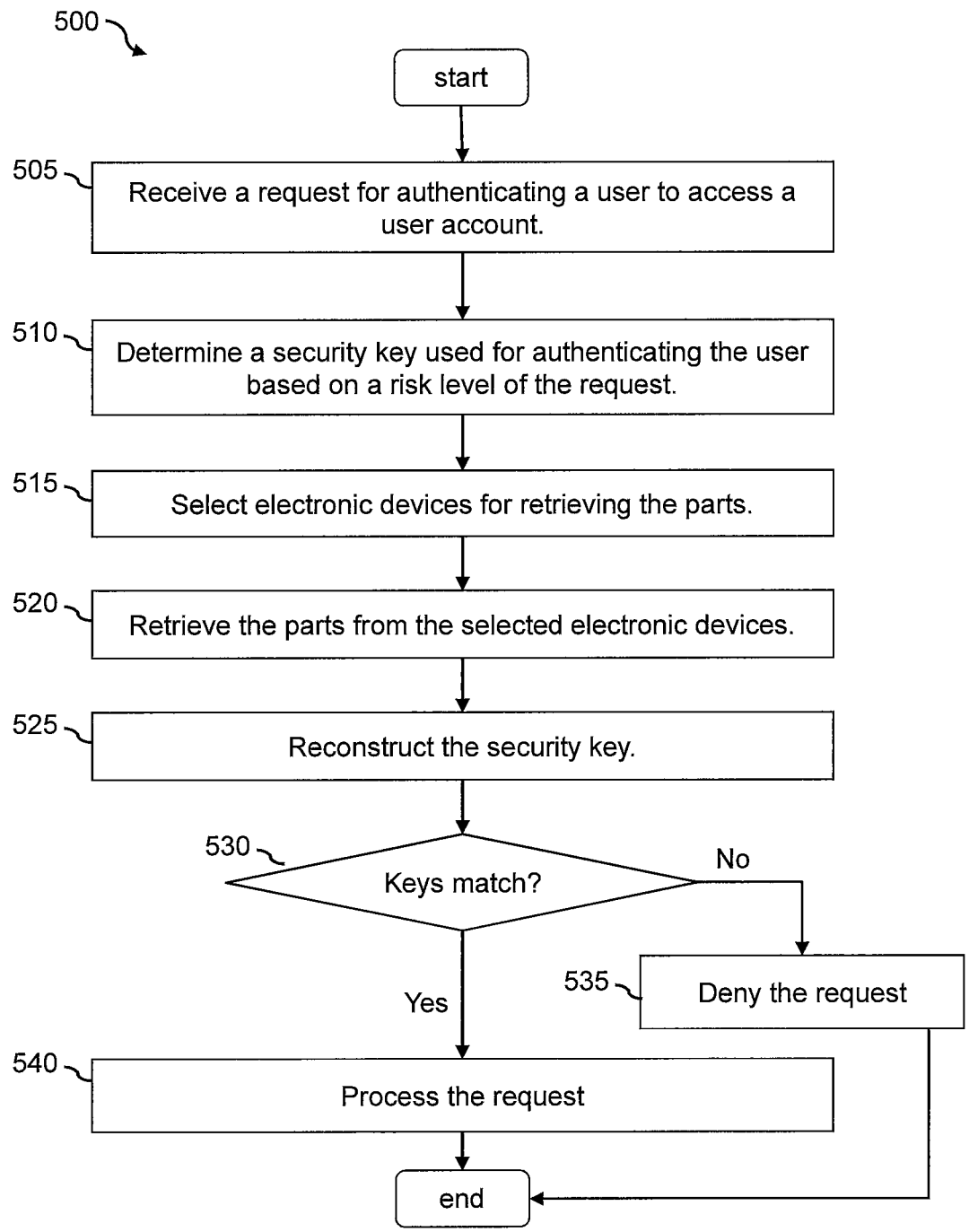
FIG. 5 is a flowchart showing a process of authenticating a user according to an embodiment of the present disclosure.

Once the parts of the security keys 204-208 are distributed and stored in the electronic devices 242-250, the user 104 may be authenticated by the authentication system 200 using the techniques disclosed herein. FIG. 4 illustrates the authentication system 200 authenticating a user according to one embodiment of the disclosure, and will be described by reference to FIG. 5, which illustrates a process 500 for authenticating a user to the authentication system 200 according to an embodiment of the disclosure. In some embodiments, the process 500 may be performed by the authentication system 200. The process 500 begins by receiving (at step 505) a request for authenticating a user to access a user account. For example, the authentication module 132 may receive an authentication request through the web server 134, the service application 138, and/or the marketplace application 122 of the merchant server 120.

As discussed above, the user 104 may use the user device 110 to interact with the web server 134, the service application 138, and/or the marketplace application 122 to perform various electronic transactions with the merchant server 120 and/or the service provider server 130. For some of the electronic transactions, such as a login transaction, a payment transaction, or an onboarding transaction, the merchant server 120 and/or the service provider server 130 may require the user 140 to be authenticated before processing the requested transaction for the user 140. For example, the user 140 may use the user interface application 112 of the user device 110 to log in to a user account with the service provider server 130. In another example, the user may also use the user interface application 112 to submit a request for an electronic payment transaction using the user account with the service provider server 130. In yet another example, the user 140 may be browsing a website associated with the merchant server 120 and may initiate an online purchase of an item on the website. In some embodiments, the merchant server 120 may be affiliated with the service provider server 130, and may transmit an authentication request to the service provider server 130 for authenticating the user 140 for the online purchase. Many other types of authentication requests are contemplated as well in various embodiments a user may need to authenticate to any Internet-based application (e.g. web application) for example. A user may also need to authenticate to a security system, for example (e.g. gaining access to a particular area or building), or more generally, any time a user may be required to provide identifying/authorized credentials.

When the authentication system 200 receives an authentication request, the authentication system 200 may determine a risk level associated with the authentication request. For example, when the authentication request is associated with a login request, the authentication system 200 may determine a risk level for the login request based on a location of the user device 110 when the login request was made (based on information obtained from the location component 118 of the user device 110) and/or a number of failed login attempts made for the user account within a predetermined period of time (e.g., within the last 24 hours, etc.). In some embodiments, the authentication system 200 may determine that the risk level of the login request is low when the user device is located at a location that is associated with the user 104 (e.g., the home of the user 104, the office of the user 104, the commute route between the home and the office, etc.) and the number of failed login attempts made for the user account is low (e.g., 0). On the other hand, the authentication system 200 may determine that the risk level of the login request is high when the number of failed login attempts made for the user account within the predetermined period of time is high (e.g., 6 times, 10 times, etc.).

When the authentication request is associated with an electronic payment transaction request, the authentication system 200 may determine the risk level of the payment transaction request based on an amount associated with the electronic payment transaction request. For example, the authentication system 200 may determine that the risk level of the payment transaction request is high when the amount associated with the payment transaction request exceeds a first predetermined threshold (e.g., $500). The authentication system 200 may determine that the risk level of the payment transaction request is low when the amount associated with the payment transaction request is below a second predetermined threshold (e.g., $20), and may determine that the risk level of the payment transaction request is medium when the amount associated with the payment transaction request is between the first and second predetermined threshold.

The process 500 then determines (at step 510) a security key used for authenticating the user based on the risk level determined for the request. As discussed above, the user account of the user 104 may be associated with multiple security keys, such as the security keys 204-208, each associated with a different risk level and requires a different number of parts to be reconstructed. As such, based on the risk level determined for the authentication request, the authentication system 200 may select the corresponding security key for the authentication request. For example, the authentication request may be associated with an electronic payment transaction in an amount of $250. As such, the authentication system 200 may determine that the risk level of the request is medium, and select the security key 204 that corresponds to a medium risk level. As discussed above, the security key 204 requires at least four parts in order to be reconstructed.

After determining the security key, the process 500 selects (at step 515) two or more electronic devices for retrieving the parts of the security key. For example, the authentication system 200 may select two or more, but not all, of the electronic devices 242-250 associated with the user account. In some embodiments, the authentication system 200 may select the two or more electronic devices based on a location and/or an activity associated with the user 104. For example, when it is determined (based on information obtained from the location component 118 of the user device 110) that the user is located at home, the authentication system 200 may select electronic devices associated with the home profile of the user account (e.g., the networked light switch 242, the smart home entertainment system 246, the networked refrigerator 248, etc.). Similarly, when it is determined that the user is located at the office, the authentication system 200 may select electronic devices associated with the office profile of the user account, and when it is determined that the user is commuting (e.g., when it is determined that the user 104 is inside a vehicle along a regular commuting route), the authentication system may select electronic devices associated with the commuting profile.

In some embodiments, the authentication system 200 may select the two or more electronic devices based on the risk level of the request and/or the number of parts required to reconstruct the determined security key. In the example above where the security key 204 is determined for the request, the authentication system 200 may determine that the security key 204 requires at least four parts to be reconstructed. As such, the authentication system 200 may select the two or more electronic devices such that the total number of parts stored in the selected two or more electronic devices have at least four parts of the security key 204.

Furthermore, the authentication system 200 may also select the two or more electronic devices such that at least two of the two or more electronic devices require different network protocols and/or network connectivity to connect to the electronic devices. Selecting electronic devices that require different network protocols and/or network connectivity to connect enhances the security and effectiveness of the authentication system 200 as it prevents false authentication of a user even when one or more of the selected electronic devices may be accessed and/or taken over by an unauthorized user.

Referring to FIG. 4, the authentication system 200 determines that the user 104 is at home based on information obtained from the location component 118 of the user device 110. Thus, the authentication system 200 selects two or more electronic devices that are associated with the home profile for authenticating the user 104. The authentication system 200 may also look up the number of parts that are stored in each of the electronic devices associated with the home profile to select the two or more electronic devices such that the number of parts stored in the selected electronic devices equals to or more than the required threshold (e.g., four) for reconstructing the security key 204. In this example, the authentication system 200 selects the networked light switch 242, the smart home entertainment system 246, and the networked refrigerator 248 for authenticating the user 104. As shown, the selected electronic devices store a total of five parts of the security key 204 based on the information stored in the database 202—the networked light switch 242 stores one part of the security key 204, the smart home entertainment system 246 stores three parts of the security key 204, and the networked refrigerator 248 stores one part of the security key 204, which exceeds the required threshold (four parts) for reconstructing the security key 204. In some embodiments, the authentication system 200 selects the two or more electronic devices such that the number of parts stored in the selected devices is more than the required threshold for reconstructing the security key, anticipating that the user 104 may not be able to connect to every one of the selected devices. In this example, since the security key 204 requires only four parts to be reconstructed, the user 104 may still be authenticated when the authentication application 216 cannot connect to either the networked light switch 242 or the networked refrigerator 248.

The process 500 then retrieves (at step 520) the parts from the selected electronic devices. For example, the authentication module 232 may instruct the authentication application 216 to establish connections with the networked light switch 242, the smart home entertainment system 246, and the networked refrigerator 248 based on their corresponding network protocols and network addresses stored in the database 202. Once the connections with the selected electronic devices are established, the authentication application 216 may retrieve, from the non-transitory memory space allocated for the authentication system 200 in the selected electronic devices, the parts of the security key 204. In this example, the authentication application 216 retrieves the part 210*a* from the networked light switch 242 via a Zigbee connection, retrieves the parts 201*d*, 210*e*, and 210*f* from the smart home entertainment system 246 via a wireless infrared communication connection, and retrieves the part 210*g* from the networked refrigerator via a Wi-Fi connection.

After retrieving the parts from the selected electronic devices, the process 500 reconstructs (at step 525) the security key based on the retrieved parts. In some embodiments, the authentication application 216 transmits the retrieved parts 210*a*, 210*d*, 210*e*, 210*f*, and 210*g* to the authentication module 232 before the authentication module 232 reconstructs the security key based on the retrieved parts. The process 500 then determines (at step 530) whether the reconstructed security key matches the security key that was originally assigned to the user account. For example, after receiving the parts 210*a*, 210*d*, 210*e*, 210*f*, and 210*g* from the authentication application 216, the authentication module 232 may reconstruct the security key 204 based on the retrieved parts, and compare the reconstructed security key with the security key 204 that was originally assigned to the user account to determine whether they match.

However, to further enhance security of the authentication system 200 (e.g., to avoid having the parts of the security key 204 transmitted over a network unnecessarily), the authentication application 216 of some embodiments may reconstruct the security key 204 based on the retrieved parts 210*a*, 210*d*, 210*e*, 210*f*, and 210*g*. The authentication application 216 may use the security key 204 to sign (e.g., encrypt) the authentication request before transmitting the signed authentication request to the authentication module 232. This way, the authentication system 200 avoids transmitting any sensitive information over the network 160. As disclosed herein, in some embodiments, the security key 204 may be a private key that corresponds to a public/private key pair. The authentication module 232 may hold (e.g., store) the corresponding public key in the database 202. When the authentication module 232 receives the signed authentication request, the authentication module 232 may verify the authenticity of the reconstructed security key (e.g., determining if the reconstructed security key matches the security key 204) by decrypting the signed authentication request using the corresponding public key.

If it is determined that the keys do not match, the process 500 denies (at step 535) the request. For example, the authentication module 232 may send a signal to the application that submitted the authentication request (e.g., the web server 134, the service application 138, and/or the marketplace application 122) indicating a failed authentication. In the example illustrated above, the authentication request is associated with a login request received from the web server 134. Thus, the authentication module 232 may send a signal to the web server 134 indicating that the authentication has failed. The web server 134 may then deny the login request based on the signal.

In some embodiments, instead of denying the request immediately, the authentication system 200 may allow for multiple tries of authenticating the user 104, by selecting different combinations of electronic devices. For example, after failing to authenticate the user 104 based on the networked light switch 242, the smart home entertainment system 246, and the networked refrigerator 248, the authentication system 200 may attempt to authenticate the user 104 by selecting a different combination of electronic devices. In some embodiments, the authentication system 200 may select the networked light switch 242, the networked refrigerator 248, and the smart watch 250 for authenticating the user 104 the second try, using the same techniques as described herein. In some embodiments, the authentication system 200 may set a predetermined number of tries of authenticating the user 104 before denying the request. For example, the authentication system 200 may deny the authentication request after failing to authenticate the user 104 twice using different combinations of electronic devices.

On the other hand, if it is determined that the keys match, the process 500 processes (at step 540) the request. For example, the authentication module 232 may send a signal to the application that submits the authentication request (e.g., the web server 134, the service application 138, and/or the marketplace application 122) indicating a successful authentication. In the example illustrated above, the authentication request is associated with an electronic payment transaction request received from the web server 134. Thus, the authentication module 232 may send a signal to the web server 134 indicating that the user 104 is authenticated. The web server 134 may then grant and process the electronic payment transaction request based on the signal.

In some embodiments, the authentication system 200 may periodically re-evaluate the electronic devices 242-250 and update the trust scores and the distribution scheme. For example, after each authentication of the user (e.g., after successfully verifying the reconstructed security key), the authentication system may re-evaluate the selected electronic devices, by accessing news regarding the electronic devices, and the hardware configurations and/or the software configurations of the electronic devices. The authentication system 200 may determine whether new security software update is available to the electronic devices and whether the new security software update has been installed on the electronic devices. For example, the authentication system 200 may determine that a latest version of the operating system that includes an updated security patch is available for the networked light switch 242. While accessing the networked light switch, the authentication application 216 may analyze the software configuration of the networked light switch 242 to determine whether the operating system has been updated to the latest version. If the authentication application 216 determines that the operating system of the networked light switch 242 has been updated to the latest version, the authentication system 200 may increase the trust score of the networked light switch 242 from '10' to '20.'

The authentication system 200 may also receive news about hacking incidents to in-vehicle management systems similar to the in-vehicle management system 244. Thus, based on the hacking incidents, the authentication system 200 may reduce the trust score of the in-vehicle management system 244 from '20' to '10.' The authentication system 200 may then update the distribution scheme based on the updated trust scores of the electronic devices 242-250, and redistribute the parts of the security keys 204-208 among the electronic devices 242-250. In this example, based on the updated trust score, the authentication system 200 may move the part 210b from the in-vehicle management system 244 to the networked light switch 242 based on the updated distribution scheme.

In some embodiments, the security of the authentication system 200 may be further enhanced by employing a key rotating scheme that changes/updates the security keys associated with the user 104. For example, the authentication system 200 may periodically replace the security keys 204-208 with three different security keys. The authentication system 200 may use the same process as disclosed herein to divide the security keys 204-208 into parts to correspond to the three risk levels, such that a first new security key that corresponds to the low risk level requires two parts to be reconstructed, a second new security key that corresponds to the medium risk level requires four parts to be reconstructed, and a third new security key that corresponds to the high risk level requires six parts to be reconstructed. The authentication system 200 may then distribute the parts of the new security keys among the electronic devices 242-250 according to the distribution scheme.

Thus, using the techniques disclosed herein, the authentication system 200 provides a secure and convenient way for a user to be authenticated. Users may no longer need to remember lengthy passwords or utilize hardware devices for scanning biometric data of the users. Instead, a user device of the user may seamlessly perform the authentication of the user by accessing electronic devices that are associated with the user according to various embodiments disclosed herein.

Figure 6:
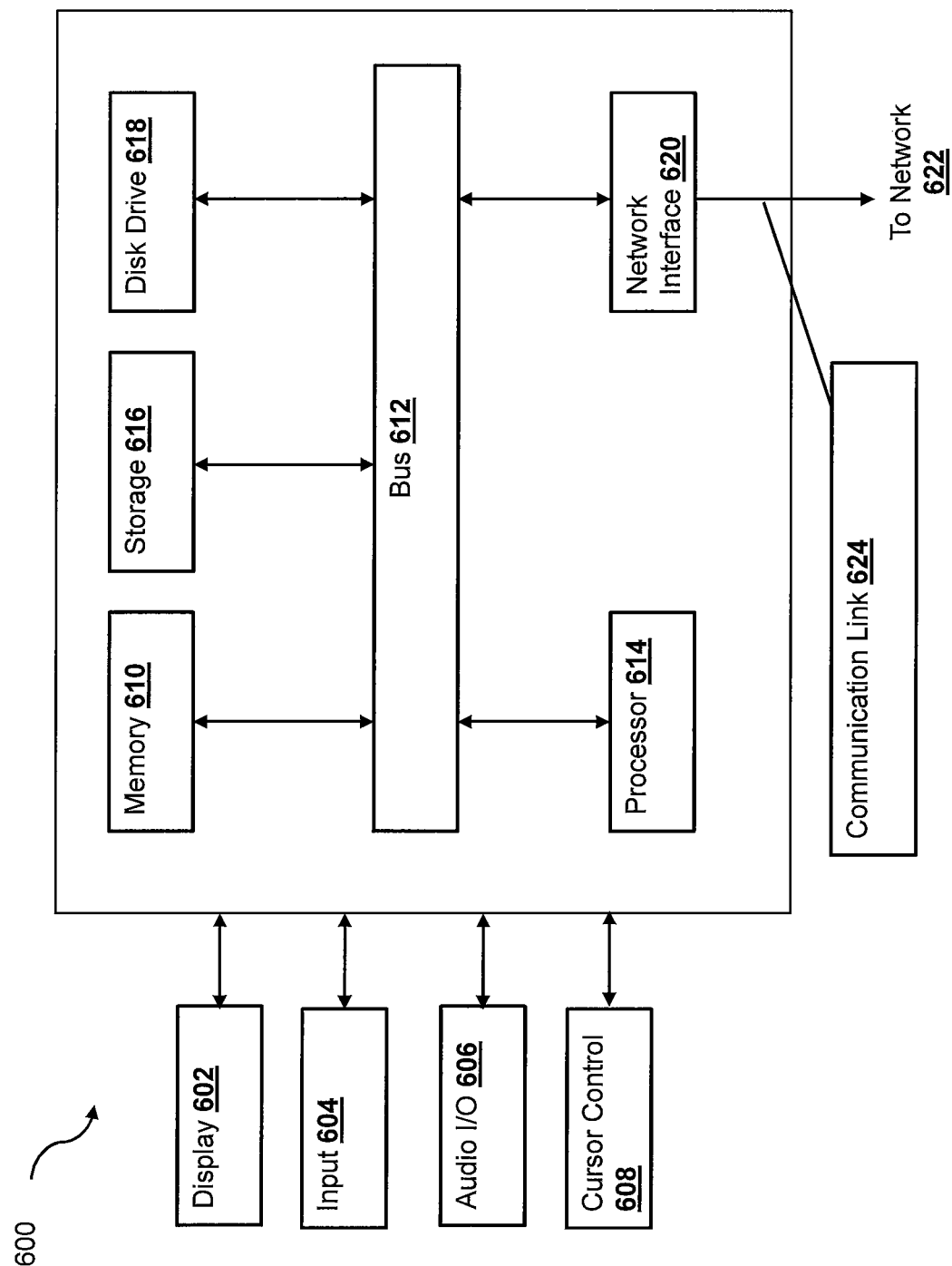
FIG. 6 is a block diagram of a system for implementing a device according to an embodiment of the present disclosure.

FIG. 6 is a block diagram of a computer system 600 suitable for implementing one or more embodiments of the present disclosure, including the service provider server 130, the merchant server 120, the user device 110, and the electronic devices 242-250. In various implementations, the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, 130, and 242-250 may be implemented as the computer system 600 in a manner as follows.

The computer system 600 includes a bus 612 or other communication mechanism for communicating information data, signals, and information between various components of the computer system 600. The components include an input/output (I/O) component 604 that processes a user (i.e., sender, recipient, service provider) action, such as selecting keys from a keypad/keyboard, selecting one or more buttons or links, etc., and sends a corresponding signal to the bus 612. The I/O component 604 may also include an output component, such as a display 602 and a cursor control 608 (such as a keyboard, keypad, mouse, etc.). The display 602 may be configured to present a login page for logging into a user account or a checkout page for purchasing an item from a merchant. An optional audio input/output component 606 may also be included to allow a user to use voice for inputting information by converting audio signals. The audio I/O component 606 may allow the user to hear audio. A transceiver or network interface 620 transmits and receives signals between the computer system 600 and other devices, such as another user device, a merchant server, or a service provider server via network 622. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or IP addresses, to other devices.

The components of the computer system 600 also include a system memory component 610 (e.g., RAM), a static storage component 616 (e.g., ROM), and/or a disk drive 618 (e.g., a solid state drive, a hard drive). The computer system 600 performs specific operations by the processor 614 and other components by executing one or more sequences of instructions contained in the system memory component 610. For example, the processor 614 can perform the risk analysis functionalities described herein according to the processes 300 and 500.

Logic may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of computer systems 600 coupled by the communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system for authenticating a user, comprising:
a non-transitory memory; and
one or more hardware processors coupled with the non-transitory memory and configured to read instructions from the non-transitory memory to cause the system to perform operations comprising:
receiving an authentication request for authenticating the user for accessing a user account via a user device, wherein the user account is associated with a security key that is divided into a plurality of parts distributed among a plurality of electronic devices associated with the user;
determining, from a plurality of profiles associated with the user account, a particular profile based on a location of the user device, wherein the particular profile specifies a first subset of the plurality of electronic devices;
selecting, from the first subset of the plurality of electronic devices, two or more electronic devices for authenticating the user;
causing the user device to electronically connect to the two or more electronic devices;
receiving, from the two or more electronic devices, (i) parts of the security key distributed to the two or more electronic devices and (ii) updated software configurations associated with the two or more electronic devices;
reconstructing the security key based on the parts of the security key received from the two or more electronic devices;
authenticating the user for accessing the user account based on the reconstructed security key; and
re-distributing the plurality of parts of the security key at least a second subset of the plurality of electronic devices based on the updated software configurations associated with the two or more electronic devices.

2. The system of claim 1, wherein the operations further comprise:
determining a risk level for authenticating the user based at least in part on the authentication request; and
selecting, from a plurality of security keys, the security key based on the determined risk level, wherein the security key requires at least a first number of parts corresponding to the determined risk level to be reconstructed.

3. The system of claim 2, wherein the authentication request corresponds to a payment transaction request associated with an amount, and wherein the risk level is determined further based on the amount with respect to a predetermined threshold amount.

4. The system of claim 2, wherein the authentication request corresponds to a purchase transaction request associated with a merchant, and wherein the risk level is determined further based on a merchant type associated with the merchant.

5. The system of claim 2, wherein the risk level is determined further based on the location of the user device.

6. The system of claim 1, wherein each one of the plurality of electronic devices includes an insufficient number of parts to reconstruct the security key, wherein the operations further comprise:
determining a prerequisite number of parts of the security key for reconstructing the security key; and
determining that the two or more electronic devices include at least the prerequisite number of parts.

7. The system of claim 1, wherein the two or more electronic devices are randomly selected from the first subset of the plurality of electronic devices.

8. The system of claim 1, wherein the causing the user device to electronically connect to the two or more electronic devices comprises:
causing the user device to establish a first type of connection with a first electronic device from the two or more electronic devices; and
causing the user device to establish a second type of connection with a second electronic device from the two or more electronic devices, wherein the first type of connection is different from the second type of connection, wherein the plurality of parts is re-distributed via the first type of connection and the second type of connection.

9. The system of claim 1, wherein the two or more electronic devices includes less than the plurality of parts.

10. A method of authenticating a user, comprising
receiving, by one or more hardware processors, an authentication request for authenticating the user for accessing a user account via a user device;
determining, by the one or more hardware processors, a risk level associated with the request;
selecting, by the one or more hardware processors from a plurality of security keys associated with the user account, a security key based on the risk level of the authentication request, wherein the security key is divided into a plurality of parts distributed among a plurality of electronic devices associated with the user, wherein the security key requires at least a prerequisite number of parts from the plurality of parts to be reconstructed;
determining, by the one or more hardware processors from a plurality of profiles associated with the user account, a particular profile based on a location of the user device, wherein the particular profile specifies a first subset of the plurality of electronic devices;
selecting, by the one or more hardware processors from the first subset of the plurality of electronic devices, two or more electronic devices for authenticating the user;
causing, by the one or more hardware processors, the user device to electronically connect to the two or more electronic devices;
retrieving, by the one or more hardware processors from the two or more electronic devices, parts of the security key distributed to the two or more electronic devices and (ii) updated device configurations associated with the two or more electronic devices;
reconstructing, by the one or more hardware processors, the security key based on the retrieved parts of the security key;
authenticating, by the one or more hardware processors, the user for accessing the user account based on the reconstructed security key; and
re-distributing, by the one or more hardware processors, the plurality of parts of the security key to at least a second subset of the plurality of electronic devices based on the updated device configurations associated with the two or more electronic devices.

11. The method of claim 10, wherein the two or more electronic devices comprise at least one of a vehicle, a smart appliance, or a wearable device.

12. The method of claim 10, wherein the retrieving the parts of the security key from the two or more electronic devices comprises:
retrieving a first number of parts from a first electronic device of the two or more electronic devices; and
retrieving a second number of parts from a second electronic device of the two or more electronic devices, wherein the first number is different from the second number.

13. The method of claim 12, wherein the first number is more than one.

14. The method of claim 10, wherein a first part of the security key is retrieved from a first electronic device of the two or more electronic devices, and wherein the redistributing the plurality of parts of the security key comprises removing the first part of the security key from the first electronic device based on the updated software configurations.

15. The method of claim 10, wherein a first part of the security key is received retrieved from a first electronic device of the two or more electronic devices, and wherein the redistributing the plurality of parts of the security key comprises storing a second part of the security key, in addition to the first part, in the first electronic device based on the updated software configurations.

16. The method of claim 10, further comprising determining that the two or more electronic devices include at least the prerequisite number of parts.

17. The method of claim 10, further comprising:
generating the security key for the user account;
dividing the security key into the plurality of parts;
determining a trust score for each of the plurality of electronic devices; and
distributing the parts of the security key among the plurality of electronic devices according to the trust scores.

18. A non-transitory machine-readable medium having stored thereon machine-readable instructions executable to cause a machine to perform operations comprising:
receiving, from a user device, an authentication request for authenticating a user for accessing a user account, wherein the user account is associated with a security key that is divided into a plurality of parts distributed among a plurality of electronic devices associated with the user;

determining, from a plurality of profiles associated with the user account, a particular profile based on a location of the user device, wherein the particular profile specifies a first subset of the plurality of electronic devices;

selecting, from the first subset of the plurality of electronic devices, two or more electronic devices for authenticating the user;

causing the user device to electronically connect to the two or more electronic devices;

retrieving, from the two or more electronic devices, (i) parts of the security key distributed to the two or more electronic devices and (ii) updated device configurations associated with the two or more electronic devices;

reconstructing the security key based on the received parts of the security key, wherein the parts of the security key received from the two or more electronic devices is less than the plurality of parts;

authenticating the user for accessing the user account based on the reconstructed security key; and re-distributing the plurality of parts of the security key to at least a second subset of the plurality of electronic devices based on the updated device configurations associated with the two or more electronic devices.

19. The non-transitory machine-readable medium of claim 18, wherein the operations further comprise:

determining a risk level associated with the authentication request; and selecting, from a plurality of security keys, the security key based on the determined risk level, wherein the first security key requires at least a prerequisite number of parts corresponding to the determined risk level to be reconstructed.

20. The non-transitory machine-readable medium of claim 19, wherein the operations further comprise determining that the two or more electronic devices includes at least the prerequisite number of parts.

* * * * *